Nov. 25, 1969  J. J. SHAUGHNESSY  3,479,698
INJECTION MOLD ASSEMBLY

Filed June 29, 1967  3 Sheets-Sheet 1

JOHN J. SHAUGHNESSY
INVENTOR.

BY
Norman S. Blodgett

United States Patent Office 3,479,698
Patented Nov. 25, 1969

---

3,479,698
INJECTION MOLD ASSEMBLY
John J. Shaughnessy, 3 Howard St.,
Townsend, Mass. 01469
Filed June 29, 1967, Ser. No. 649,918
Int. Cl. B29f 1/14
U.S. Cl. 18—42                                              7 Claims

ABSTRACT OF THE DISCLOSURE

This invention has to do with an injection mold assembly and, more particularly, to apparatus for the injection molding of articles, wherein means is provided to assure that the molded article is ejected from the mold when it is opened after the article has been formed.

BACKGROUND OF THE INVENTION

In the operation of an injection molding machine, the mold is opened after each injection for the removal of the article which has been formed. For this purpose, the mold is provided with ejector pins along which one half of the mold slides. The pins remain behind and hold the molded article so that the article falls downwardly between the two open halves of the mold. In many cases, however, the article formed is such that it hangs on the pins and does not fall downwardly out of the area of action of the mold halves. In that case, when the molds come back together, the article is caught between the two halves of the mold, resulting in mold damage and stoppage of production. For that reason, it is necessary, under present molding techniques, to provide an operator for each machine to assure that the molded article falls downwardly and is not left hanging on the ejector pins. If it were not for the necessity for such a caretaker for each machine, one operator could operate several molding machines and his only concern would be keeping the raw plastic hoppers full. These and other difficulties experienced with the prior art devices have been obviated in a novel manner by the present invention.

It is, therefore, an outstanding object of the invention to provide an injection mold assembly in which removal of a finished molded article from between the mold halves is assured.

Another object of this invention is the provision of an injection mold assembly which removes the need for an operator to watch each molding machine.

A further object of the present invention is the provision of an injection mold assembly which is simple in construction, which is easy to adapt to present molds, and which is capable of a long life of useful service with a minimum of attention.

It is another object of the instant invention to provide an injection mold assembly which will permit an injection molding machine to be operated with a shorter time cycle than is presently customary.

A still further object of the invention is the provision of an injection mold assembly in which removal of the finished article is assured despite the use of extremely long ejector pins, despite the use of pins having identification letters formed on them, and despite the flashing that sometimes results from wear around the ejector pin.

It is a further object of the invention to provide an injection mold assembly which assures part removal despite poor mold design.

With these and other objects in view, as will be apparent to those skilled in the art, the invention resides in the combination of parts set forth in the specification and covered by the claims appended hereto.

SUMMARY OF THE INVENTION

Generally speaking, the present invention consists of an injection mold assembly in which the ejector plate is spring-loaded during the mold assembly motion and is suddenly released so that the ejector pins are thrust forwardly very quickly and with considerable force to assure the removal of the molded parts, leaders, and so on. This is accomplished by having a spring-loaded detent associated with a notch in an ejector plate return pin. The knockout bar is made with sliding elements so that, as the knockout bar proceeds forwardly, it tries to push the ejector plate toward the mold. The ejector plate and its pins slide freely for a predetermined distance and the part is lifted gently out of the mold. Eventually, however, the ejector plate is prevented from sliding further because of the detent engaging the end of a notch in the ejector plate return pin. A spring surrounding a plunger in the knockout bar builds up pressure and, eventually, the end of the sliding plunger hits an adjustable limit bar, so that considerable force is brought to bear against the ejector plate. This releases the ejector plate return pin from the detent suddenly, so that the force in the main spring surrounding the plunger is released, thus throwing the ejector plate forwardly. The ejector pins are thrown forwardly with considerable speed and force to throw the molded parts off of the pins.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
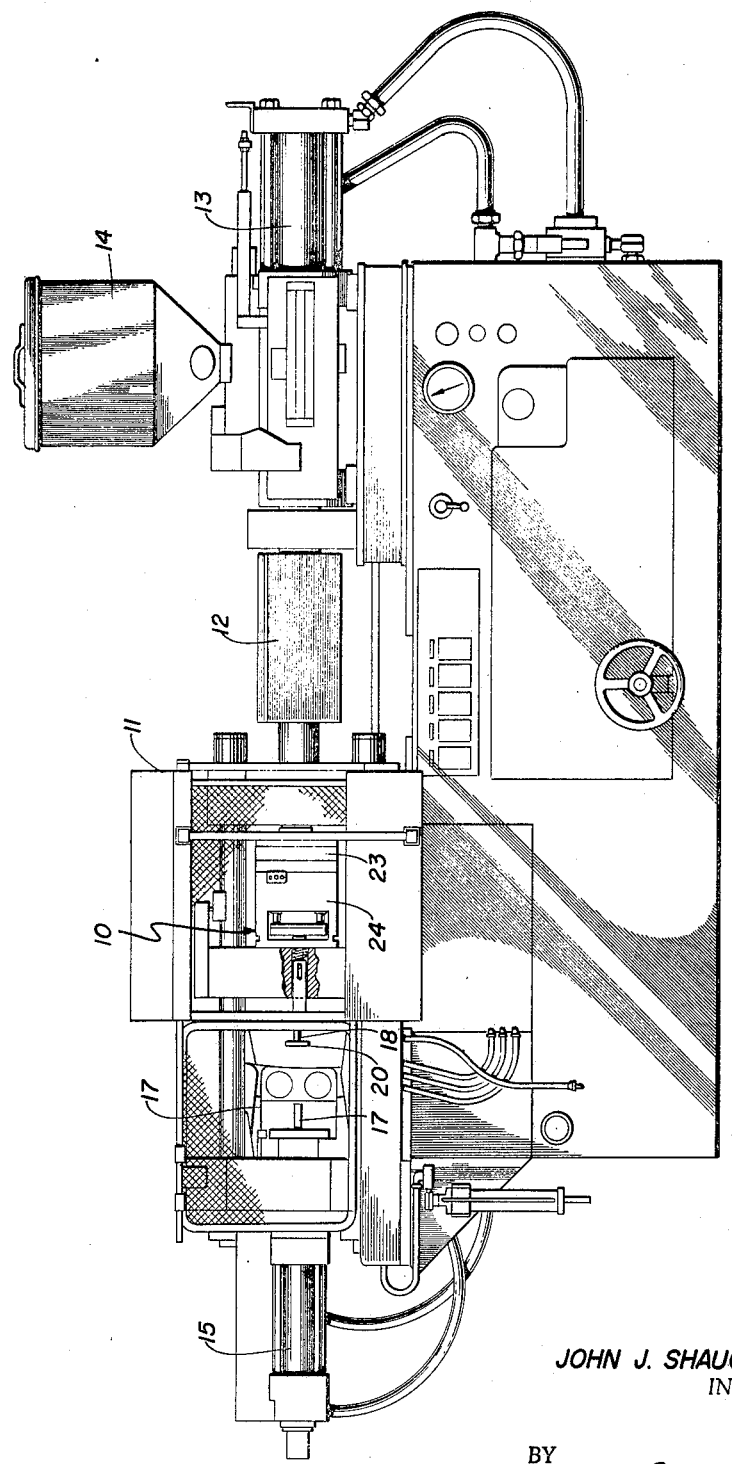
FIG. 1 is a front elevational view of an injection molding assembly making use of the principles of the present invention.

Referring first to FIG. 1, wherein are best shown the general features of the invention, the injection mold assembly, designated generally by the reference numeral 10, is shown in use with an injecting molding machine 11. The machine is of the general type having a horizontal plunger 12 operated by a hydraulic cylinder 13 and receiving its supply of plastic from a hopper 14. The opening and closing of the mold assembly takes place by means of a cylinder 15 operating through a toggle mechanism 16. A stop rod 17 is provided in position to engage the transverse knockout bar 20 which is connected to a knockout bar 18 extending from the injection mold assembly 10.

Figure 2:
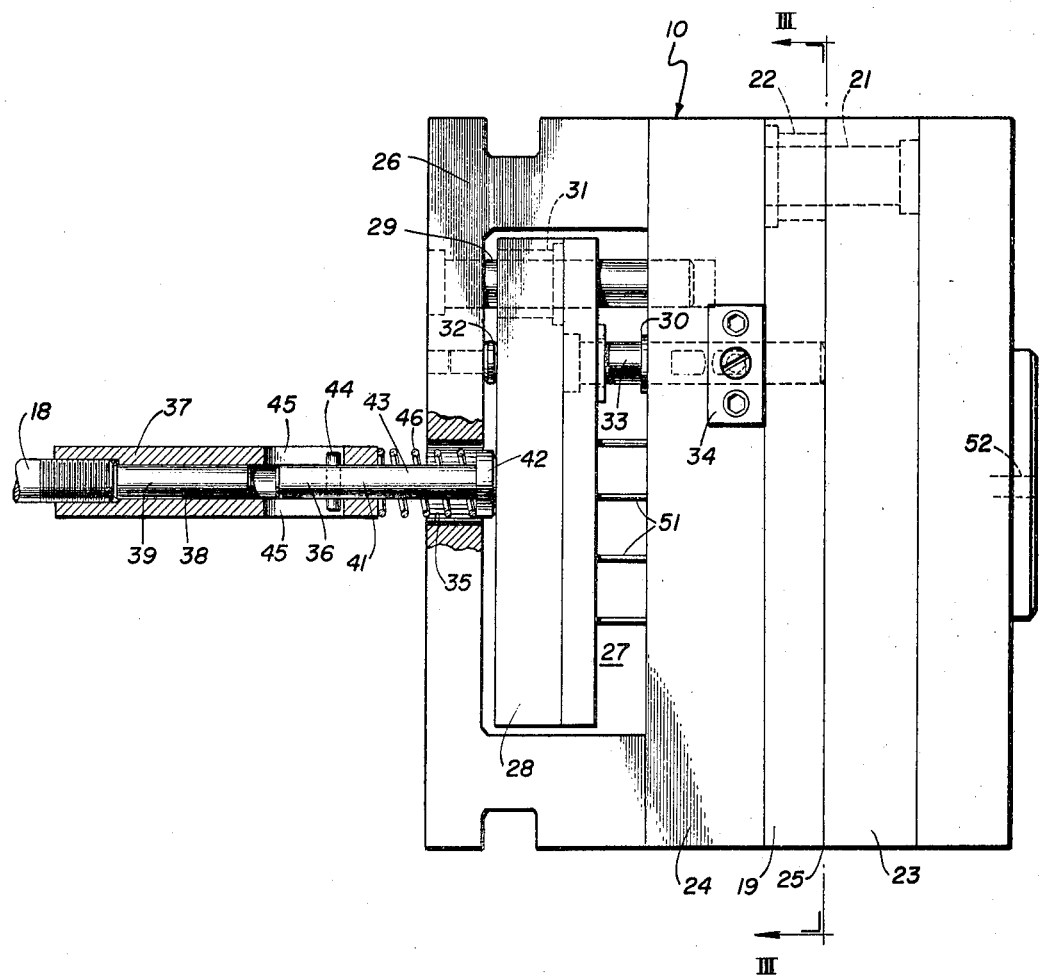
FIG. 2 is an enlarged front elevational view of the injection mold assembly.

In FIG. 2 it can be seen that the injection mold assembly 10 is provided with a mold 19 consisting of a mold half 23, and a mold half 24 separable along a parting plane 25. A series of guide pins 21 extend from the mold half 23 into sleeves 22 formed in the mold half 24 and extend perpendicularly to the parting plane 25. The pins serve to guide the relative separating movement between the mold halves. Mounted on the side of the mold half 24 opposite the mold half 23 is an ejector housing 26 provided with a rectilinear recess 27 in which is located a flat ejector plate 28. The ejector plate is guided for sliding motion in the recess 27 by means of guide pins 29 sliding in sleeves 31 mounted in the ejector plate. A series of stops 32 mounted in the ejector housing and extending into the recess 27 limit the motion of the ejector plate away from the mold half 24, while its motion in the other direction is limited only by engagement with the face of the mold which is directed toward it. Mounted on the ejector plate 28 and extending through bores in the mold are a series of ejector plate return pins 33 at least one of which is provided with a detent means 34 which will be described in greater detail hereinafter.

The ejector housing 26 is provided with an opening 35 with which is associated a knockout means 36. The knockout rod 18 is threaded into one of a sleeve 37. This sleeve is provided with a bore 38 in which is slidably mounted an adjustable limit bar 39. Also slidable in the bore 38 is a plunger 41 having at its outer end a head 42 and having a shank 43 which is slidable in the bore 38. The shank is provided with a transverse pin 44 which extends into longitudinal slots 45 formed in the sides of the sleeve 37. Finally, between the head 42 and the end of the sleeve 37 is mounted a coil spring 46.

Figure 3:
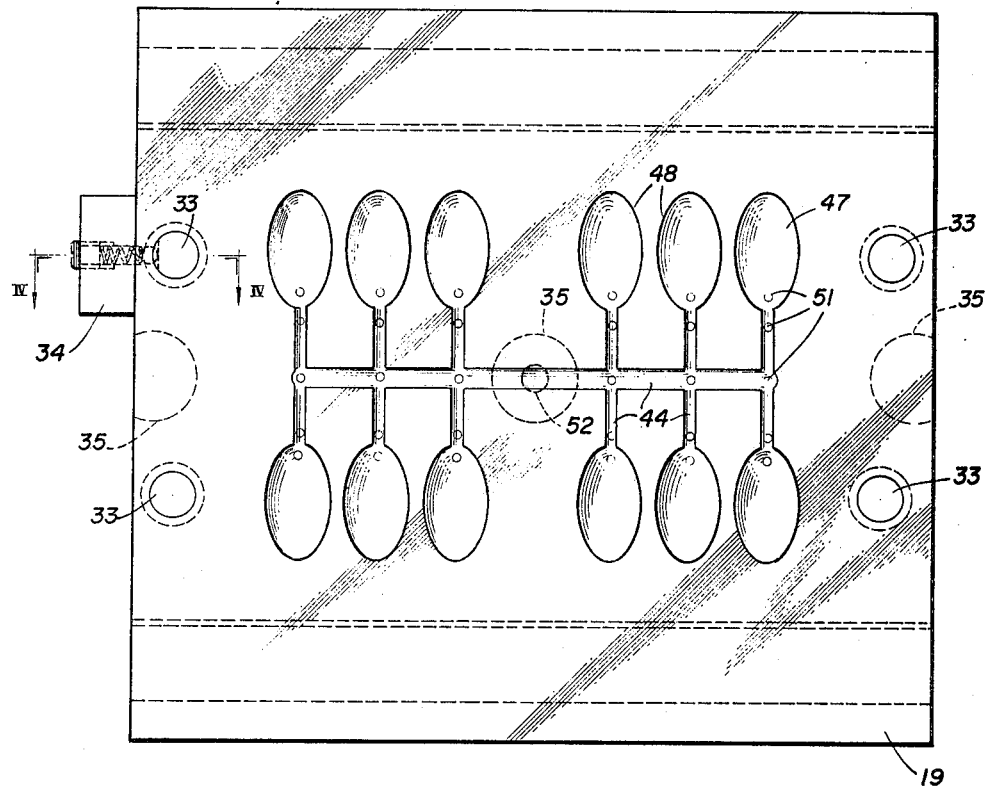
FIG. 3 is a transverse sectional view of the invention taken on the line III—III of FIG. 2.

Referring now to FIG. 3, it can be seen that the mold 19 is provided with a cavity 47. This cavity consists of article-forming cavities 48 which are joined by flow passages 49. The ejector plate 28 is provided with ejector pins 51 which extend through the mold half 24 into the cavity 47. Some of them are located in the article-forming cavities 48 and some in the flow passages 49. In the center of the cavity 47 is located the opening 52 through which the plastic is injected into the cavity. In this view are shown in dotted lines three openings 35 which can be used with separate knockout means 36. Also in this view are shown four ejector plate return pins 33, only one of which in the preferred embodiment is provided with a detent means 34.

Figure 4:
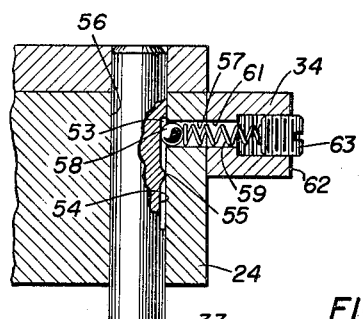
FIG. 4 is a sectional view taken on the line IV—IV of FIG. 3.

Referring now to FIG. 4, which shows the details of the detent means 34, it can be seen that the ejector plate return pin 33 is provided with two flats or notches 53 and 54 between which lies a short unnotched portion of the return pin which acts as a protuberance 55. The wall of the mold half 24 adjacent the bore 56 in which the pin 33 slides is formed with a transverse bore 57 in which is mounted a ball 58 and a spring 59. The spring also extends into a bore 61 formed in a block 62 which is mounted on the wall of the mold. The bore 61 is counterbored and threaded at its outer end and provided with a threaded plug 63 which permits adjustment of the compression of the spring 59.

The operation of the invention will now be readily understood in view of the above description. Raw plastic from the hopper 14 falls into the plunger 12 and is pressed toward the mold 13 which is in the closed condition shown in FIG. 1. As soon as the load of plastic has been injected into the mold and has hardened, the cylinder 15 is energized to operate through the toggle 16 to separate the halves of the mold. The mold half 23 remains in place, while the mold half 24 and the ejector housing 26 are moved to the left (in FIG. 2). The mold starts to open to expose the cavity 47 which is now filled with plastic. As the mold half 24 and the ejector housing 26 move to the left, they carry the ejector plate 28 with them. Eventually, the knockout bar 20 and the knockout rod 18 will engage the stop rod 17 in the machine and will move to the left no further. The ejector housing 26 continues to move to the left, but the ejector plate 28 remains behind and the pins 51 start to lift the molded article out of the cavity 47. This "free travel" of the ejector plate is possible because of the elongated nature of the notch 53 in the ejector plate return pin 33, which allows this motion of the ejector plate 28 relative to the mold until the detent means strikes the protuberance 55. However, because the knockout rod 18 is no longer movable to the left, neither is the sleeve 37; this means that the ejector plate 28 presses on the head 42 of the knockout means 36 and, because of the pressure of the detent ball 58 against the protuberance 55, begins to compress the spring 46. This brings spring pressure to bear against the ejector plate 28 and resiliently biases it toward the right in the recess 27. It cannot move further to the right, however, because the detent ball 58 associated with the detent means 34 is engaged in the notch 53 and, presumably, the protuberance 55 is pressing tightly against the ball.

Thus, because the ejector plate 28 remains in its more or less original position within the recess 27 in the ejector housing 26, the plunger 41 is pushed to the left and the spring 46 is compressed. Eventually, however, the end of the shank 43 of the plunger strikes the end of the limit bar 39 and a rigid series of bars is formed by the stop rod 17, the knockout bar 20, the knockout rod 18, the limit bar 39, and the plunger 41. Any further movement, therefore, of the mold half 24 and the ejector housing 26 produces forces between the detent ball 58 and the protuberance 55 such that the ball 58 is pushed to the right (in FIG. 4) against the tension in the spring 59. The ball 58, therefore, rides up over the protuberance 55 into the notch 54 and the ejector plate return pin 33 is allowed to progress through the bore 56 in the mold. Now, the release of the detent means in this manner takes place very suddenly and the ejector plate 28 is suddenly released, while the coil spring 46 is still very decidedly in a compressed condition. The spring 46, therefore, operates through the head 42 of the plunger 41 to throw the ejector plate 28 to the right so that the ejector pins 51 suddenly are thrown with tremendous force further into the cavity 47 and beyond, thus carrying the molded article to the right also. Eventually, the ejector plate comes into contact with nylon pads 30 on the mold and suddenly stops. This causes the molded article to be projected (by its inertia) far ahead of the ejector pins and to fall downwardly in the space between the ends of the ejector pins and the face of the fixed half 23 of the mold.

From the above discussion, it can be seen that the present invention solves a number of problems which have slowed down the process of the injection molding art. Suitable advances have been made in the last few years because of improved molding materials, better machines, more sophisticated tooling procedures, a wealth of research facilities, and a large number of well-informed technicians. In spite of these gains in the field, there has been a holdup to more rapid and more economical molding. The problem is that the manufacturers in the plastic field continue to smash costly molds by closing machines on partly ejected articles. This results in costly repair work, production delays, and dissatisfied customers. Time has proven that the mere fact that one assigns an operator to the task of clearing the mold before recycling the machine is not entirely an answer to the problem. The operator only adds the human factor to the problem and, of course, represents a considerable expenditure in labor cost. There are several reasons for improper ejection of molded parts; one reason, of course, is poor design of the mold. This could include not only the part design but the cavity and core design as well as the ejector pin placement. Another reason for poor ejection is the provision of a long ejector pin which actually forms a depression in the molded part. The walls of this depression can still hold the part on the pin, so that it cannot fall with the rest of the load or "shot." Another factor that leads to the failure of the molded article to fall away from the face of the mold and the pins is the use of letters or numerals stamped on the ends of the pins to provide part identification. The plastic article has a tendency to hang in these areas. Another reason is the presence of flashing on the finished part; this flashing results from wearing which takes place in the ejector pin hole or from wearing of the pin itself. The gap between the pin surface and its hole surface can provide a flash in the molded article in time and this causes sticking of the molded article. A common procedure in the past has been to subject the injection molding machine to a tremendous shock in order to make the molded parts fall off the ejector pins but, of course, this only operates to destroy the machine long before its time and results in costly operations of the factory. In some cases, the present invention can operate as a "trouble shooter"; that is to say, if the invention is used in a particular molding operation and the part still sticks to the ejector pins, this means that there is some tremendous defect in the mold or the pins (such as a large burr) and this can be corrected before extensive damage results.

In a commercial installation of the present invention, the invention was installed in an 8-cavity subgated nylon mold that was being run for a major electrical shaver manufacturer. Before the installation of the invention, the machine was run with an operator who was required to remove several of the molded pieces each time before recycling the machine. Because of individual differences in operators, the manufacturer felt obliged to use a gate-clock in order to assure consistent cycling and the overall cycle took 25 seconds. After installing and adjusting the present invention, it was possible to eliminate the operator, to reduce the cycle by more than one-half, and to complete in ten days a run that previously would have required more than twenty. The part that was manufactured was subject to very close tolerance of the type used in industrial components and was subjected to a very rigid inspection by the customer, but there were no rejects.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An injection mold assembly, comprising
   (a) two mold halves defining a mold cavity between them and mounted for sliding relative to one another in one direction,
   (b) an ejector plate mounted adjacent one of the mold halves for sliding relative thereto in the said one direction,
   (c) ejector pins mounted on the ejector plate and extending through the said one of the mold halves to the cavity,
   (d) a knockout rod engaging the ejector plate to cause it to move toward the said one of the mold halves and said knock-out rod including a lost motion element having a loading spring,
   (e) and means preventing the ejector plate from moving toward the said one of the mold halves, despite operation of the knockout rod, until the spring has been stressed by a predetermined amount and then releasing the plate suddenly.

2. An injection mold assembly as recited in claim 1, wherein ejector return pins are mounted on the ejector plate and wherein the said one of the mold halves is provided with bores to receive these pins to guide the plate and mold half during their relative sliding motion.

3. An injection mold assembly as recited in claim 2, wherein a spring-loaded detent extends into one of the bores and engages a notch in the ejector return pin residing in that bore.

4. An injection mold assembly as recited in claim 3, wherein another notch is formed on the pin and is separated from the first-named notch by a small protuberance, the length of the first-mentioned notch being such that the ejector return pin can move through the bore in the mold half a predetermined distance before the detent engages the protuberance.

5. An injection mold assembly as recited in claim 1, wherein the knockout rod includes a tubular sleeve, an adjustable limit bar slidable in the sleeve, and a plunger having a shank mounted in the sleeve and a head outside of the sleeve.

6. An injection mold assembly as recited in claim 5, wherein the loading spring extends around the shank of the plunger between its head and an end of the sleeve and wherein a pin extends transversely of the shank of the plunger into a longitudinal slot in the sleeve.

7. An injection mold assembly, comprising
   (a) a mold having a cavity and a parting plane along which separation takes place,
   (b) an ejector plate mounted adjacent the mold for movement in a direction perpendicular to the parting plane,
   (c) ejector pins mounted on the ejector plate and extending through the mold to the cavity,
   (d) means engaging the ejector plate to bring about relative movement between it and the mold and the said means including a lost motion element having a loading spring, and
   (e) means resisting the movement of the ejector plate relative to the mold until the spring has been loaded by a predetermined amount and then releasing the plate suddenly.

References Cited
UNITED STATES PATENTS

| | | | |
|---|---|---|---|
| 3,044,120 | 7/1962 | Wiskoff et al. | 249—68 |
| 3,044,121 | 7/1962 | Wiskoff et al. | 249—68 |
| 3,049,758 | 8/1962 | Drevalas. | |
| 3,161,918 | 12/1964 | Zearbaugh. | |
| 3,213,490 | 10/1965 | Johnson. | |
| 3,315,302 | 4/1967 | Phillipson et al. | |
| 3,362,046 | 1/1968 | Blumer. | |

J. HOWARD FLINT, JR., Primary Examiner

U.S. Cl. X.R.

249—68